Nov. 27, 1973 JEAN-MARIE CHEYPE 3,775,358
METALLIZABLE INSULATING VARNISH AND
PROCESS OF FABRICATION THEREOF
Filed Aug. 11, 1971
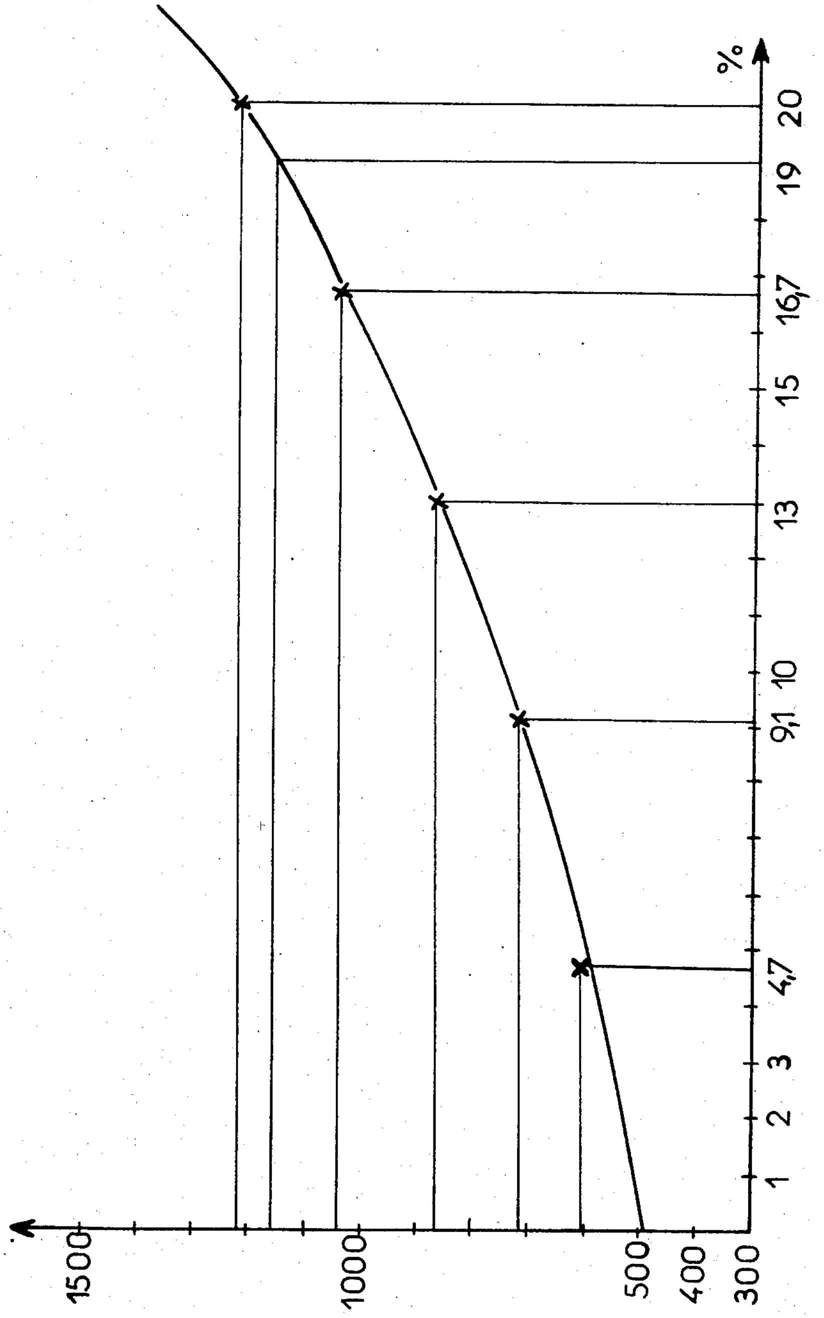
INVENTO
Jean-Marie Cheype
BY
ATTORNE

United States Patent Office 3,775,358
Patented Nov. 27, 1973

3,775,358

METALLIZABLE INSULATING VARNISH AND PROCESS OF FABRICATION THEREOF

Jean-Marie Cheype, Gagny, France, assignor to Societe Industrielle Honeywell Bull, Paris, France Filed Aug. 11, 1971, Ser. No. 170,682
Claims priority, application France, July 22, 1970, 7026993
Int. Cl. C09d *3/52, 3/58*
U.S. Cl. 260—21 12 Claims

ABSTRACT OF THE DISCLOSURE

An insulating varnish comprising an epoxy resin, fatty acid, urea-formal resin and an organic diluent adapted to be polymerized by the addition of a hardener and suited for receiving a coating of a continuous, adhering metal layer after polymerization.

BACKGROUND OF THE INVENTION

This invention relates to a metallizable insulating varnish, as well as to the process of fabrication thereof.

Magnetic memory structures of the type which have been described and shown in the French Pat. No. 1,520,-404, filed Oct. 7, 1966, are known. In such structures, conductive elements in the form of tape or wire, each coated with a film of magnetic material, are disposed parallel to each other on a non-magnetic metallic block which forms the substrate of the structure and serves as ground during the operation of the memory. These conductive elements are insulated from each other and the substrate by means of an insulating layer, deposited previously on the substrate, which prevents any electrical contact between such elements and the substrate. This insulating layer may be constituted, for example, of silicon monoxide, of silicon or of organic resins, such as the aromatic polyimides or the polyepoxides.

The deposition of the various constituent metallic layers of conductive elements coated with magnetic material may be realized by resorting to various methods such as, for example vacuum evaporation.. However, the process of electrolytic deposition is the most advantageous because of its variable cost and because it provides for obtaining, at ambient temperature, metallic layers of several microns thickness and thin magnetic layers which are anisotropic and have zero mean magnetostriction and for which the thickness and the magnetic properties are controllable within very wide limits. The execution of this process, however, requires that the insulating layer which is deposited on the substrate be previously coated with a layer of conductive material. This coating may be effected, either by utilizing the technique of vacuum metalization or by utilizing the technique of chemical metallization. The vacuum metallization enables the depositing of a metallic layer on a great variety of insulating materials, however, it has the disadvantage of requiring the employment of a relatively costly material. Furthermore, the sensitive operating conditions do not permit even a slight deviation in the conditions required for obtaining metallic depositions whose properties are practically identical from one specimen to the other. Therefore, the method of chemical metallization is preferred, because chemical metallization, not requiring any means for realizing a vacuum or for raising the temperature, provides for a much simpler and more rapid execution.

The insulating materials capable of being chemically coated with an adherent deposition of metal are relatively few in number. The use of these materials as insulating layers in memory structures of the type mentioned above is further limited because such layers must satisfy several conditions. This layer must provide excellent electrical isolation between the conductive elements of the memory and the substrate, even if its thickness is very low somewhat; i.e., of the order of five microns. Such a layer must be further capable of tolerating, without suffering deterioration, temperatures of the order of 150° C., these temperatures being those which are ordinarily utilized for the well known annealing treatment for stabilization of the magnetic properties of the magnetic material. Finally, such a layer must be able to resist the action of chemical agents, such as acids and bases, which are customarily employed for selectively etching the circuits constituting the metallic elements of these memory structures. Heretofore, no insulating material was known which satisfied all of these conditions, because even those on which could be formed a strongly adherent metallic deposition by chemical means, such as the polyacetals and the plastic materials of the A.B.S. type (acrylonitrile, butadiene, styrene), commence to deteriorate as soon as their temperature exceeds about 100° C.

Therefore it is the object of the instant invention to remedy these disadvantages and provide an insulating varnish which, after polymerization, can be coated by chemical means with a strongly adherent metallic deposition, and which meets all required conditions to be especially useful in memory structures of the type above described.

SUMMARY OF THE INVENTION

The invention concerns an insulating varnish polymerizable by the addition of a hardener and adapted to be covered, at least in part after polymerization, with a continuous, adherent layer of metal deposited by chemical means. This varnish is characterized as being formed from an epoxy resin, from a fatty acid of a quantity intended to substantially double the epoxy equivalent of the resin, from a urea-formol resin of a proportion less than 10% in weight of the epoxy resin, and from any organic diluent other than an ester.

Other characteristics and advantages of the invention will become apparent from the following description, which is provided only by way of example and not with the intent to be limiting.

BRIEF DESCRIPTION OF THE DRAWING

The invention will be described with reference to the accompanying drawing, wherein the sole figure is a curve representing the variation of the epoxy equivalent of a resin of the epichlorohydrin-diphenylolpropane type as a function of the percent of esterification when the fatty acid of bidistilled soybean oil is utilized for esterification of this resin.

DESCRIPTION OF THE PREFERRED EMBODIMENT

The base material which is utilized for producing the insulating varnish of the invention consists of an epoxy resin which may be any of the types which are produced industrially from epichlorohydrin and diphenylolpropane and which corresponds to the general formula:

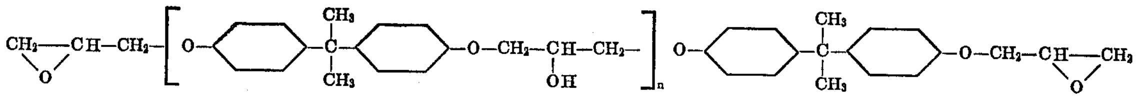

in which *n* is between 0 and 10.

Thus, in the example which will be described hereinafter, the resin of this type which is utilized is sold in France under the name of "Epikote 1001" by the Compagnie Francaise des Produits Chimiques Shell. This resin, whose formula corresponds to that written above, with $n$ equal to about 2.15, has an epoxy equivalent of 450 to 525 and a melting temperature of about 70° C.

For obtaining the insulating varnish of the invention, the process commences with an epoxy resin of the type mentioned above and a partial esterification of its groups is effected by utilizing a fatty acid. This fatty acid may consist of palmitic acid, stearic acid, oleic acid, etc., or of a mixture of these acids. Thus, in the example described, the acid utilized is the fatty acid of bidistilled soybean oil, which melts at the temperature of 26° C. and which has the following composition (by weight):

| | Percent |
|---|---|
| Palmitic acid | 8.25 |
| Stearic acid | 5.35 |
| Arachidic acid | 0.9 |
| Oleic acid | 24.9 |
| Linoleic acid | 52.65 |
| Linolenic acid | 7.9 |
| Arachidonic acid | 0.05 |

The esterification is performed by heating the mixture formed by the epoxy resin and the fatty acid and by bubbling into the resulting liquid mixture, a neutral gas such as nitrogen, to prevent the oxidation of the resin. This operation is carried out at a temperature sufficient to obtain a complete reaction. Thus, in the example described, esterification has been realized in the epoxy resin "Epikote 1001" by the fatty acid of soybean oil by operating at a temperature of about 260° C.

According to one characteristic of the invention, there is utilized for the esterification of the epoxy resin, a quantity of fatty acid such that the epoxy equivalent of the esterified resin is substantially doubled compared to the non-esterified resin. The proportion of fatty acid which produces this result may be easily determined from the curve representing the variation of epoxy equivalent of the partially esterified resin as a function of the percent of esterification. This curve, which has the pattern of that which has been shown by way of example on the accompanying figure, may be plotted experimentally, point-by-point, by marking the corresponding value of the epoxy equivalent of the resin for each value of the percentage of fatty acid utilized for effecting the esterification. The value of the epoxy equivalent which corresponds to a predetermined percentage of fatty acid may be calculated by a known method, for example by utilizing the method of Devoe and Raynolds that has been expounded in the paper of J. Schrede, entitled "The Epoxy Resins," published in 1957, pages 167–170. This method consists of preparing a solution of pyridine hydrochloride in pyridine, by mixing 16 $cm.^3$ of 32% hydrochloric acid with a liter of pure pyridine, in a manner to obtain a solution of which the normality is approximately equal to 0.2 N. Moreover, the value of this normality is established in a precise manner as to amount by means of an 0.2 N solution of soda. An alcohol solution of 1% thymol phtalein is utilized as an indicator of the critical point. Meanwhile, a quantity of partially esterified resin, approximately one gram, after being weighted, is dissolved in an excess solution of approximately 40% pyridine hydrochloride solution which has been prepared. This is heated for twenty minutes in a reflux, and, after cooling, the hydrochloric acid not absorbed by the epoxide is treated by means of the 0.2 N solution of soda, utilizing the same indicator of critical point as that described previously. The calculation of the epoxy equivalent is based on the hypothesis that an epoxy group reacts with a molecule of hydrochloric acid according to the formula:

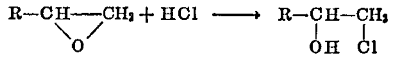

Under these conditions, the epoxy equivalent is given by the following relation:

$$\text{Epoxy equivalent} = \frac{g}{\frac{N(b-a)}{1000}} = \frac{1000g}{N(b-a)}$$

in which $g$ designates the weight of the quantity of resin taken for analysis, $b$ and $a$ represent, respectively, the number of cubic centimeters of soda employed for treating the solution of pyridine hydrochloride and for treating the excess of hydrochloric acid not absorbed by the resin, and N is the normality of the soda solution utilized for these treatments.

In the case where an 0.2 N solution of soda is employed, the above relationship becomes:

$$\text{Epoxy equivalent} = \frac{5000g}{b-a}$$

Thus, the value of the epoxy equivalent which corresponds to a particular percent of fatty acid can be calculated, thereby enabling the subsequent plotting, point-by-point, of the curve of the variation of epoxy equivalent of the resin as a function of the percent of esterification. The curve shown in the accompanying figure, by way of example, of the variation of epoxy of the resin "Epikote 1001" (shown as ordinates) as a function of the percentage of fatty acid of the soybean oil (shown as abscissa). In this figure, the experimental points have been shown by crosses. Referring to this figure, it is seen that the epoxy equivalent of this resin which is approximately 500 when the resin is not esterified, will be practically double when the percent of fatty acid of soybean oil utilized for esterifying this resin is substantially equal to 16%. By "substantially," is intended to mean that the percentage may vary a few percent on one side or the other of the value for which the epoxy equivalent is found to be exactly double. Thus, in the instance of the accompanying figure, it is understood that suitable esterification of the resin as realized was a percent of fatty acid of soybean oil between 13% and 19%.

After having esterified the epoxy resin in the manner indicated, it is permitted to cool until it reaches a temperature of about 100° C., whereupon it is diluted in a suitable proportion of organic solvent, in such a manner as to obtain a viscous product which, on one hand, may be easily spread on a substrate, and which, on the other hand, may be preserved for a very long time at ambient temperature without undergoing alteration. For realizing this dilution, any organic diluent may be used, with the exception, however, of the esters. Thus there can be utilized for example, the ketones, the ethers, the alcohols, and the benzine carbides. Immediately before being added to the resin, this solvent is preheated to facilitate the dilution of such resin. Further, during such dilution, a vigorous mechanical agitation must be maintained in order to achieve homogeneity of the resin and the solvent. This mixture is then permitted to cool to a temperature of about 30° C., whereupon an equalization agent is added thereto, which agent consists of a resin of the urea-formol type of a proportion less than 10% by weight of the epoxy resin. After having been homogenized, the solution so obtained is filtered through a Teflon filter, having openings of 5 microns, and finally may be stored in a glass container.

Where the source resin has been prepared according to the method described above, before being spread on a metallic substrate, it must be mixed with a hardener capable of producing the polymerization of such resin. This hardener may be of the type which is normally utilized for hardening the epoxy resin, such as the acid anhydrides, the amines, and the polyamides resulting from the reaction of the fatty polyacids and the aliphatic polyamines, with the exception, however, of triethanolamine which has given only disappointing results.

In a preferred mode of realization of the invention, the source resin has been obtained from the epoxy resin "Epikote 1001" previously mentioned herein. The esterification of this resin is accomplished by heating to 260° C. a mixture formed of 100 grams of "Epikote 1001" resin and of 20 grams of fatty acid of soybean oil. The percent of esterification, in such instance, is equal to 20/120, or 16.7%. The epoxy equivalent of the resin so esterified is approximately equal to 1040. After having been cooled to a temperature of the order of 100° C., this resin is then diluted in a solvent consisting of monoethylic ether of ethylene glycol or ethanol 2-ethoxy, which has been previously heated and then maintained at a temperature of approximately 80° C. By utilizing the 240 grams of this solvent, a mixture is obtained of which the viscosity at ambient temperature is approximately equal to 0.8 poise. After being homogenized, this mixture is permitted to cool. When its temperature reaches above 30° C., 4 grams of a urea-formol resin is added, such resin being manufactured by the British company "Imperial Chemical Industries Limited" and which is sold in France under the name "Paralac 6001." The solution so obtained is homogenized and then filtered to constitute the source resin.

The preferable hardener which has been selected for hardening this source resin is a polyaminoamide that is produced industrially by the American company "General Mills, Inc" and which is sold in France under the name "Versamid 600" by the company "Schering France." Experience has shown that it is possible to obtain on a metallic substrate in a reproducible manner, a prefectly hardened insulating film of varnish having a thickness of approximately 10 microns by heating a mixture constituted of 244 grams of this source resin and a quantity of about 82 grams of "Versamid 600" to 125° C. for twenty-four hours. It is to be noted that the quantity of "Versamid 600" utilized for forming this mixture is not critical and that the mixture offers the advantage of having a viscosity that only increases very slowly with ambient temperature. Under these conditions, it is possible to realize this mixture well before it is to be spread on the substrate. In order to spread this mixture on the substrate, a wheel is utilized which consists essentially of a horizontal circular plate rotated by an electric motor whose speed can be varied by adjustment of the supply voltage. Furthermore, the time of the increase of the velocity of the wheel can be varied; i.e. the time at the end of which, having been initially at rest, the wheel has attained the chosen speed of rotation by being driven by the motor. For regulating this time of increase to a predetermined value which, in the example described as of the order of 15 seconds, the intensity of the excitation current of the motor is controlled. After having accomplished these adjustments, the metallic substrate is attached to the platform of the turntable. In the example described, this substrate constitutes a plate of polished brass, rectangular in form. After pouring a sufficient quantity of the mixture formed from the source resin and the hardener on the substrate, the motor is energized for driving the platform for a period of the order of four to five minutes. When this spreading is completed, the substrate coated with its layer of varnish is placed into a dryer at 125° C. for twenty-four hours, to induce polymerization of the varnish. A second layer of varnish is deposited, under the same conditions, on this first layer and polymerized in turn at 125° C. for twenty-four hours. The purpose of this mode of fabrication is to reduce the risks of short-circuits due to dust particles. By proceeding in the manner which has been described and by effecting the spreading of the varnish on the substrate in two successive layers at a speed of 900 revolutions per minute, there is obtained in effect, after polymerization, an insulating film of varnish having a total thickness of 13 microns and exhibitng a surface state such that the amplitude of surface defects is of the order of 1000 A. The spreading of the varnish can also be realized under the same conditions as those described previously, but by operating at the speed of 1500 revolutions per minute. In this instance there is obtained, after polymerization, an insulating film of varnish of 10 microns thickness and having an amplitude of surface defects less than 800 A. Finally, effecting the spreading of the varnish at the speed of 2000 revolutions per minute, there is obtained, after polymerization, an insulating film of varnish of 8 microns thickness and having an amplitude of surface defects between 300 and 500 A.

It is to be noted that the adhesion of the film of varnish on its substrate depends on the surface state of such substrate. It was determined from the example, that the adhesion of such film on a substrate of polished copper is markedly less than that obtained by utilizing a substrate of polished brass.

It is to be noted further that the polymerized insulating varnish film which has been obtained on a metallic substrate by the method described previously herein, is especially well adapted for being itself coated by a continuous, firmly adhering, metallic layer, deposited by a chemical process. Thus, for example, there can be deposited on this film of varnish a perfectly adhering layer of copper by utilizing a known copper solution, adapted to form, on such a film, a chemical deposition of copper. However, before carrying out this chemical metallization process, it is necessary to first create a micro-relief of the surface of the varnish film by a suitable chemical attack. This micro-relief is indispensible to enable a good adhesion of the metal to the varnish. The atack is effected with the aid of an alkaline solution which provokes a selected saponification of the varnish. Preferably, for providing this attack, an alkaline solution is utilized formed by the dilution in water of a product which is manufactured industrially by the American company "Shipley Company Inc." and which is sold in France under the name of "Al-Chelate." This solution has the the following composition:

| | |
|---|---|
| Al-Chelate | One volume. |
| Deionized water | Fifteen volumes. |

Thus, a solution is achieved whose pH is greater than 11. The substrate coated with the insulating varnish film is then immersed for five minutes in this solution, maintained at a temperature of 80° C. The coated substrate is then immersed for 30 seconds in an aqueous solution of 200 grams per liter of ammonium persulfate, maintained at a temperature of 20° C. After rinsing, the substrate coated with its film of varnish is immersed for 20 seconds in a 5 N solution of hydrochloric acid.

The insulating varnish film is then ready to be coated with a layer of metal deposited by chemical means. For example, a chemical deposition of copper can be realized on the insulating varnish by utilizing a range of industrial products which are sold in France by the French company "Pernix-Enthone" under the names of "Sensitizer 432," "Activator 440," "Enplate CU 400-A" and "Enplate CU 400-B." The operation, in this instance is as follows. The copper substrate coated with its varnish film is first immersed for five minutes in the following solution whose composition is:

| | |
|---|---|
| "Sensitizer 432" | 1 volume. |
| Deionized water | 15 volumes. |

After rinsing the support coated with its film is immersed for two minutes in a solution composed of:

| | |
|---|---|
| "Activator" | 1 volume. |
| Deionized water | 16 volumes. |

After another rinsing, the substrate and its film is immersed for two minutes in a chemical copper solution "Enplate CU 400," formed of a mixture of "Enplate CU 400-A" and "Enplate CU 400-B." This chemical copper solution has the following composition:

| | |
|---|---|
| "Enplate CU 400–A" | 2 volumes. |
| "Enplate CU 400–B" | 5 volumes. |
| Deionized water | 9 volumes. |

By operating under the above described conditions, there is obtained on the insulating varnish a perfectly adhering chemical copper deposition having a thickness approximately equal to 0.2 microns. This chemical deposition operation is followed by a rinsing, a drying with filtered compressed air, and a storing for about 12 hours at a temperature of approximately 20° C., to enable the eliquation of the dissolution products.

It is to be noted that the mode of chemical metallization of varnish which has been described herein is not a limited characteristic of the invention and that there can be obtained on this varnish a perfectly adhering metallic deposit by utilizing other known methods of chemical metallization.

Much that has been described in the foregoing is characteristic of the invention. It is evident that one skilled in the art is able to adduce all modifications of form and of detail using his judgment, without departing from the scope of this invention.

What is claimed is:

1. An insulating varnish polymerizable by the addition of a hardener and adapted to be covered after polymerization, at least in part, by a continuous adhering layer of metal deposited by chemical means, said varnish comprising:
   - an epoxy resin produced from epichlorophydrin and diphenylolpropane,
   - a quantity of a fatty acid which substantially doubles the epoxy equivalent of the epoxy resin,
   - a urea-formol resin in an amount less than 10% by weight of the epoxy resin, and
   - an organic diluent selected from the group consisting of ketone, an ether, an alcohol, and benzene carbides.

2. The insulating varnish of claim 1 wherein the epoxy resin used has an epoxy equivalent from 450–525.

3. The insulating varnish of claim 1, wherein said fatty acid is the fatty acid of bidistilled soybean oil.

4. The insulating varnish of claim 1 wherein the amount of fatty acid is between 13%–19% by weight of said epoxy resin.

5. The insulating varnish of claim 1 wherein said hardener is an acid anhydride, an amine, or a polyamide resulting from the reaction of the fatty polyacids and the aliphatic polyamines, with the exception of, triethanolamine.

6. The process for preparing an insulating varnish polymerizable by the addition of a hardener and adapted to be covered, at least in part, after polymerization with a continuous adherent layer of metal deposited by chemical means, said process comprising:
   - reacting by heating a mixture of an epoxy resin produced from epichlorophydrin and diphenylolpropane and a quantity of a fatty acid which substantially doubles the epoxy equivalent of the epoxy resin,
   - diluting the epoxy resin thus esterified in an organic diluent selected from the group consisting of ketones, ethers, alcohols, and benzene carbides,
   - adding, after said dilution, a urea-formol resin in an amount less than 10% by weight of said epoxy resin, and
   - filtering, after homogenizing the solution so obtained.

7. The process of claim 6, wherein esterification of the epoxy resin by the fatty acid is effected by bubbling a neutral gas to prevent the oxidation of said epoxy resin into the mixture of epoxy resin and fatty acid rendered under the action of said heating.

8. The process of claim 6, wherein said epoxy resin used has an epoxy equivalent of between 450–525.

9. The process of claim 6, wherein the proportion of urea-formol resin utilized is substantially equal to 1% by weight of said epoxy resin.

10. The process of claim 6, wherein said fatty acid utilized for esterfying said epoxy resin has the following composition:

| | Percent |
|---|---|
| Palmitic acid | 8.25 |
| Stearic acid | 5.35 |
| Arachidic acid | 0.9 |
| Oleic acid | 24.9 |
| Linoleic acid | 52.65 |
| Linolenic acid | 7.9 |
| Arachidonic acid | 0.05 |

11. The process of claim 10, wherein said epoxy resin has an epoxy equivalent between 450–525, and a melting point of about 70° C., and wherein the quantity of said fatty acid utilized for esterifying said resin is substantially between 13%–19% by weight of said epoxy resin, said esterification being effected at a temperature of approximately 260° C.

12. The process of claim 11, wherein said organic diluent is monoethylic ether of ethylene glycol, and wherein immediately before adding the esterified epoxy resin, said diluent is raised to a temperature of approximately 80° C.

References Cited

UNITED STATES PATENTS

| | | | |
|---|---|---|---|
| 3,598,775 | 8/1971 | Huggard | 260—18 EP |
| 3,277,034 | 10/1966 | Boylan | 260—21 |
| 2,700,030 | 1/1955 | Widmer et al. | 260—18 EP |
| 3,280,056 | 10/1966 | Masters | 260—21 |
| 3,471,421 | 10/1969 | Vegter et al. | 260—21 |
| 3,562,081 | 2/1971 | Stalego | 260—18 EP |

OTHER REFERENCES

Lee & Neville, Handbook of Epoxy Resins, McGraw-Hill Book Company, New York, N.Y., 1967, pp. 24–6 to 24–8 and 24–24.

DONALD E. CZAJA, Primary Examiner
R. W. GRIFFIN, Assistant Examiner

U.S. Cl. X.R.

117—132 BE, 161 LN, 161 ZB, 217; 260—18 EP, 32.8 EP, 33.2 EP, 33.4 EP